(12) United States Patent
Stiekes et al.

(10) Patent No.: US 10,044,760 B2
(45) Date of Patent: Aug. 7, 2018

(54) POLICY RULE BASED ON A REQUESTED BEHAVIOR

(71) Applicant: Hewlett Packard Enterprise Development LP, Houston, TX (US)

(72) Inventors: Bryan Stiekes, Brownstown Township, MI (US); Sebastien Tandel, Porto Alegre-Rio Grande do Sul (BR); Jechun Chiu, Austin, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 94 days.

(21) Appl. No.: 15/100,710

(22) PCT Filed: Dec. 4, 2013

(86) PCT No.: PCT/US2013/073130
§ 371 (c)(1),
(2) Date: Jun. 1, 2016

(87) PCT Pub. No.: WO2015/084343
PCT Pub. Date: Jun. 11, 2015

(65) Prior Publication Data
US 2016/0308905 A1 Oct. 20, 2016

(51) Int. Cl.
*H04L 29/06* (2006.01)
*H04L 12/813* (2013.01)
(Continued)

(52) U.S. Cl.
CPC .......... *H04L 63/20* (2013.01); *H04L 41/20* (2013.01); *H04L 43/028* (2013.01); *H04L 45/74* (2013.01);
(Continued)

(58) Field of Classification Search
CPC ...................................................... H04L 63/20
See application file for complete search history.

(56) References Cited

U.S. PATENT DOCUMENTS 5,870,561 A * 2/1999 Jarvis .................. H04L 41/0893
                                                             379/221.06
6,301,613 B1 * 10/2001 Ahlstrom ............ H04L 41/0853
                                                             709/223
(Continued)

FOREIGN PATENT DOCUMENTS

KR     10-2013-0124692 A     11/2013

OTHER PUBLICATIONS

Greenberg et al.; A clean slate 4D approach to network control and management; Published in: Newsletter ACM SIGCOMM Computer Communication Review; Homepage archive vol. 35 Issue 5, Oct. 2005; pp. 41-54; ACM Digital Library (Year: 2005).*

(Continued)

*Primary Examiner* — Bradley Holder
(74) *Attorney, Agent, or Firm* — Hewlett Packard Enterprise Patent Department (57) ABSTRACT

In one implementation, an example system may include a policy engine. The policy engine may receive a context of an application to request a set of network traffic and provide a policy rule to a network device of a network path. In another implementation, an example system may identify a party and a requested behavior of the service and maintain a context to determine a policy rule to regulate a set of network traffic associated with the service based on the party and the requested behavior. In another implementation, an example method may comprise receiving a service request and an authentication, identifying a party, identifying a behavior, and deploying a policy to a network device of a network based on the party and the behavior.

17 Claims, 4 Drawing Sheets

(51) Int. Cl.
  H04L 12/24    (2006.01)
  H04L 12/26    (2006.01)
  H04L 12/741   (2013.01)

(52) U.S. Cl.
  CPC .............. H04L 47/20 (2013.01); H04L 63/08 (2013.01); H04L 63/166 (2013.01)

(56) References Cited

U.S. PATENT DOCUMENTS

| | | | | |
|---|---|---|---|---|
| 6,393,474 | B1* | 5/2002 | Eichert | H04L 41/0893 709/221 |
| 6,578,076 | B1* | 6/2003 | Putzolu | H04L 41/0213 709/219 |
| 6,816,973 | B1 | 11/2004 | Gleichauf et al. | |
| 7,185,073 | B1 | 2/2007 | Gai et al. | |
| 8,059,533 | B2* | 11/2011 | Andreasen | H04L 41/0893 370/230 |
| 2007/0136783 | A1 | 6/2007 | Shelest et al. | |
| 2009/0109845 | A1* | 4/2009 | Andreasen | H04L 41/0893 370/230 |
| 2010/0131650 | A1* | 5/2010 | Pok | H04L 41/0896 709/226 |
| 2010/0290485 | A1 | 11/2010 | Martini et al. | |
| 2011/0219426 | A1* | 9/2011 | Kim | H04L 41/5058 726/1 |
| 2013/0124712 | A1 | 5/2013 | Parker | |
| 2013/0223442 | A1 | 8/2013 | Narayanan et al. | |

OTHER PUBLICATIONS

Lupu et. al.; Conflicts in policy-based distributed systems management; Published in: IEEE Transactions on Software Engineering ( vol. 25, Issue: 6, Nov./Dec. 1999 ); pp. 852-869; IEEE Xplore (Year: 1999).*
ISR/WO—PCT Appl. No. PCT/US2013/073130 filed Sep. 2, 2014—12 pages.
"Deliver HP Virtual Application Networks", Sep. 2012—8 pages.
Tang, C. et al, "A Dynamic and Self-Adaptive Network Security Policy Realization Mechanism", 2008 IFIP Int'l Conf., Oct. 18-21, 2008—8 pages.
Piagentini, Nick, PaloAlto Networks, Elevated Privileges and User ID in Active Directory Environments, 2011 (5 pages).
Wikipedia, Network Access Control last modified Aug. 22, 2013 (9 pages).
Woland, Aaron, Security Network Access, Opinion—Security Group Tagging Basics, Jun. 2013 (7 pages).

* cited by examiner

POLICY RULE BASED ON A REQUESTED BEHAVIOR

BACKGROUND

A network may commonly be accessed through a network perimeter, or network edge, to request access to a service. A common approach to secure the network edge may include deployment of statically configured firewall devices. The firewall devices may be configured to permit communication between the maximal set of potential services to a source of request. For example, an internet protocol ("IP") address may be designated as an allowable source and the network may use a protocol port associated with the IP address to determine if traffic is allowable. Commonly, the traffic may be inspected according to a predetermined pattern to identify potentially safe traffic. Packet inspection and specially-configured network devices may create bottlenecks or other impedances in network traffic. Such specially-configured network devices and packet inspection devices may be relatively expensive additions to a network.

DETAILED DESCRIPTION

In the following description and figures, some example implementations of systems and/or methods for providing a service are described. Some examples of the systems and methods are described specifically for use in a software-defined networking ("SDN") environment. However it should be noted that examples of providing a service described herein may be utilized in a variety of appropriate systems and applications. In particular, a system for providing a service may regulate a service that is able to map to a network flow to a network path based on the service. Therefore, SDN environments are a potential use of the network element identification system. Thus any reference to SDN-specific elements and/or methods is included to provide context for specific examples described herein.

SDN-compatible networks may provide a service or multiple services to devices or other networks. As used herein, a service is any appropriate supplying of communication, transmissions, software, storage, or any other product, resource, or activity that may be capable of executing on a network of electronic devices. SDN-compatible networks may abstract the hardware of the system from the services being provided. For example, an SDN network may decouple the traffic control decisions from the physical systems that forward network traffic. An SDN network may allow the service to be provided without regard to the underlying physical hardware. For example, a first network device may become latent from receiving too many requests and the SDN network may initiate the service to follow a different traffic flow through a second network device. As another example, the network device or a port of the network device may be malfunctioning and traffic may be rerouted. In both examples, the customer may not notice a change in service because the SDN controller may make the network routing decisions autonomously. For security purposes, a network perimeter that depends largely on the deployment of statically configured firewall devices may congest the network or may otherwise be inconsistent with the abstracted control plane objective of an SDN network.

Various examples described below relate to providing a service based on a requested behavior of the service. By determining a network policy based on a requested behavior, a network may determine and forward a policy to a set of network devices in a customized way and/or controlled in a manner based on a desired degree of precision. For example, the network perimeter may be secured based on service behavior for which the traffic is being requested. As used herein, the term "based on" means "based at least in part on." Thus, a feature that is described as based on some stimulus can be based only on the stimulus or a combination of stimuli including the stimulus. Furthermore, as used herein, a policy is any appropriate manner of management, government, or administration of a network, and a behavior is any appropriate function or action that is part of or related to a service. For example, a request for service may include multiple behaviors, commonly expressed via a protocol port. Behavior-level policy decision making may allow for minimizing access to the network perimeter rather than allowing maximum access based on IP address or protocol authentication.

Figure 1:
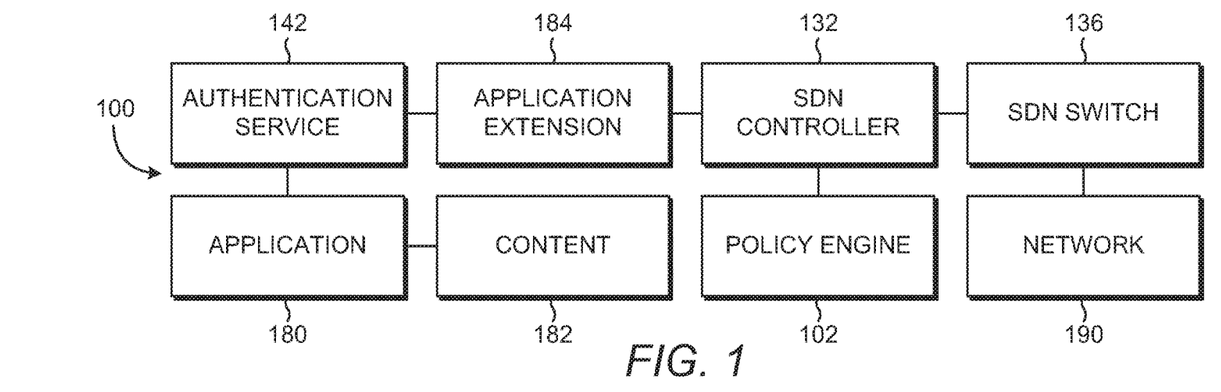
FIGS. 1-3 are block diagrams depicting example systems for providing a service.

FIG. 1 is a block diagram depicting an example system 100 for providing a service. In general, an example system 100 for providing a service may generally comprise an application extension 184 and a policy engine 102. The application extension is any combination of circuitry and executable instructions configured to perform as an intermediary between the application 180 and the network 190. More particularly, the application extension 184 may extend from an application 180 to the policy engine 102 of a controller that manages the network 190. The example policy engine 102 may manage a network policy and provide the network policy to the network 190. For example, in the SDN environment depicted in FIG. 1, the policy engine 102 on the SDN controller 132 may provide the network policy, such as forwarding policy, to an SDN switch 136 connected to the network 190. The policy engine 102 may provide a default policy to the SDN switch 136 and other devices of the network 190. For example, to secure the network 190, the default policy may be to deny traffic. That is, unless authentication has been provided to create an exception to the default policy, network traffic may be dropped, routed to the network perimeter, or otherwise not allowed to pass over the network 190.

The example system 100 may also include an example application 180 having content 182 and an authentication service 142. For example, access requests may only be allowed to the authentication service 142 of the application 180 until a user is authenticated. Once authenticated, the application extension 184 may identify the party requesting authentication based on supplied credentials. The application extension 184 may also identify the service and the behaviors of the service that are being requested by the identified party. The application extension 184 may provide the party's identity and the requested behavior to the SDN controller 132 having, or otherwise in communication with the policy engine 102. The application extension 184 may also pass on other information, such as metadata regarding the request, to the policy engine 102.

The information may be used to determine a network policy. For example, the application extension 184 may provide a context of the service request, which may include the identity of the party, the service and behavior(s) being requested, and the protocol that will be used to perform the requested behavior. In another example, the application 180 may be exposed by an application programming interface ("API") and the context may be retrieved by the SDN controller 132 via the API. As used herein, the term "context" is used to describe the information used to determine the network policy. The policy engine 102 may determine the minimal amount of authorization required to perform the requested behavior and provide that policy to the SDN network, and the rest of the device on the network 190.

The service may be performed and the SDN controller 132 may be aware of when the service has completed or may terminate. For example, the context may include the size or number of packets used to transmit the content 182. The SDN controller 132 may then retrieve the default policy rule and forward that rule to the device 136 of the network 190. For example, the default policy may be to deny all traffic across the network 190 and thereby, secure the network 190 from unauthorized traffic. By maintaining a default denial state and limiting user access to the authentication service 142 of the application, the network 190 may be minimally open to access when the request is known to be authenticated and prevent other traffic over the network 190.

Figure 2:
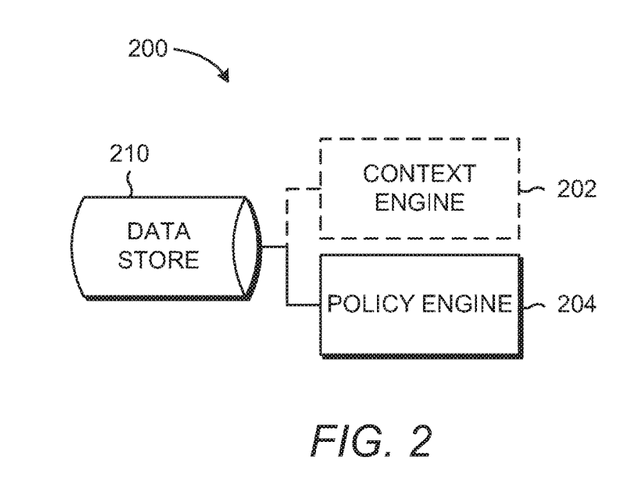
Figure 3:
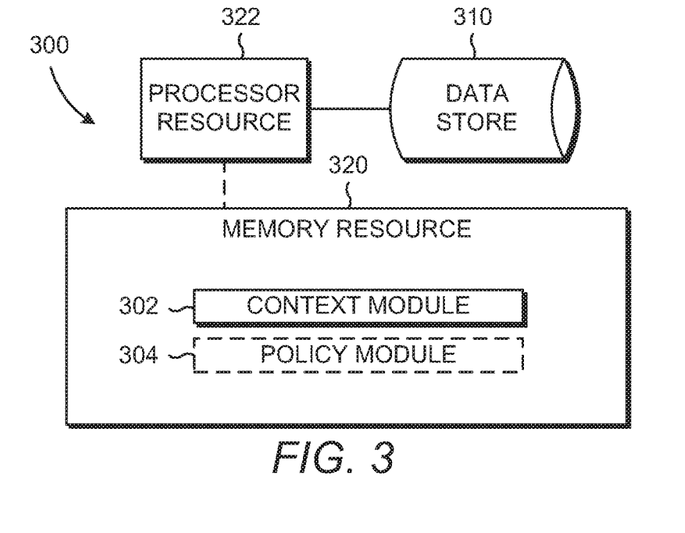

FIGS. 2 and 3 are block diagrams depicting example systems for providing a service. Referring to FIG. 2, an example system 200 for providing a service may generally comprise a policy engine 204. The example system 200 may also include a context engine 202 and a data store 210. The terms "include," "have," and variations thereof, as used herein, have the same meaning as the term "comprise" or appropriate variation thereof. The dotted lines of FIGS. 2 and 3 refer to connections, engines, and/or modules that may be possible variations of the system. For example in FIG. 2, the system 200 may include a policy engine 204 and/or a context engine 202.

The context engine 202 represents any combination of circuitry and executable instructions configured to maintain a context of an application. An application, as used hereinafter, is a set of executable instructions to provide a service, such as a computer program. For example, a communications application may include instructions that when executed provide a communications service. A context may be a set of data that represents the state of the application, the state of the request, and/or the state of a system. The context may be maintained by adding, removing, comparing, modifying, retrieving, or other action to prepare and/or make available the set of data associated with the context of the application, the request, and/or the system. For example, the context may be maintained by receiving the context as part of the service request, requesting the context from the system, or monitoring the application, the request, and/or the system to update the context. The context may be related to a service request of an application. For example, the application may request a set of network traffic to perform a service and the context of the request for service may include a requested behavior of the service enabled by the application. The context engine 202 may receive data from an application and identify the context from the data. For example, the context engine 202 may identify a party requesting service and identify a requested behavior of the service. The data from the application may be received directly, by a set of network traffic, or by retrieval from the data store 210. A set of network traffic, as used herein, is any appropriate form of data transmission, such as a number of network packets or a bit stream. A set of network traffic may be the same as a network flow.

The context is any appropriate set of data containing information related to the service request. As mentioned, that may include a party and a requested behavior. The party may be the source of the request, such as a user. Other data and metadata may be part of the context. For example, the context may include an IP address and protocol, object data of the application, and/or a system event. The context may be maintained and provided as a set of parameters related to the service request. The application may track or otherwise perform an action to maintain data to determine a context and the context may be provided to the system 200 using an application extension. As discussed further herein, the context may be maintained by the context engine 202 to determine a policy rule to regulate a set of network traffic associated with the service. For example, the context may be maintained and provided to the policy engine to regulate a set of network traffic based on a party and a requested behavior of the context.

The context engine 202 may be part of an application extension that may integrate with the application's authentication mechanism. For example, the application extension may communicate the context to a policy engine 204. The context may be communicated in a traditional network-centric syntax, including source address, destination address, and protocol. Alternatively, the context may be communicated in a natural language syntax interpretable by a policy engine 204 and/or a controller. The policy, and the policy rule discussed below, may also be communicated in a traditional network-centric syntax or a natural language syntax.

The policy engine 204 represents any combination of circuitry and executable instructions configured to provide a policy rule to a network device of a network path. The policy rule is any appropriate procedure, control, principle, or other directive expression associated with network traffic and/or communication related to the service to determine conduct based on a condition. For example, the policy rule may be a forwarding rule and the condition is any appropriate conditional expression, such as matching of parameters. The condition parameters may be similar to the parameters of the context. The condition parameters may include a duration adverb or otherwise relate to duration, such as "always forward a set of network traffic matching context A to security device X."

The policy engine 204 may be located on a device connected to the network, such as a client device, server device, or network device. For example, the policy engine 204 may be located on a controller of a network device to provide a policy rule to forward a set of traffic through a particular route across the network. The network device is a device of a network of electronic devices for providing an exchange of information, or network flow, among the electronic devices, such as a network router or network switch, and may be located on a network path that may be a set of network devices of the network. A controller may be able to create network flows and communicate with other controllers and/or devices of the network. For example, the controller may be an SDN controller and a SDN-enabled network device may receive the policy rule form the SDN controller to forward the set of network traffic based on the policy rule through a network path that includes a set of network devices authorized to provide the service.

The policy rule may regulate a set of network traffic based on the context. For example, a party may request a particular behavior that satisfies the condition of a result in forwarding the set of network traffic, sending a packet, such as an acknowledgement packet ("ACK") or a reset packet ("RST") to the application providing the request, or awaiting a second set of network traffic to make a forwarding determination. A policy rule may be inclusive or exclusive. For example, the policy rule may list a set of impermissible behaviors, and request associated with an impermissible behavior may be denied. The policy engine 204 may receive a context of an application to request a set of network traffic. For example, the policy engine 204 may receive from the context engine 202 an identity of a party and a requested behavior of a service enabled by an application. The policy engine 204 may receive the data directly from the context engine 202, from the set of network traffic, or from the data store 210.

A policy rule determination based on context may allow for precise control of traffic over the network in comparison to a policy rule based on only IP address or identity of a party. For example, a party may be authorized to communicate over an instant message feature of an application and traffic associated with the video conference feature of the application may be forwarded to the edge of the network because the requested behavior is not authorized, even if requested by an authenticated party.

The policy engine 204 may maintain a set of permissible behaviors to occur on a network based on the party and the service. For example, the application may allow identity A to communicate via instant messaging, and identity B to communicate via instant messaging or computer-to-computer video conference. In that example, both identity A and identity B may be authenticated by the application and may communicate over the instant messaging feature, but video conferencing traffic may be allowed only if it is associated with identity B.

The policy engine 204 may also maintain a set of impermissible behaviors. For example, the network may not allow traffic associated with voice over IP ("VOIP") communication to lines outside the company. More particularly, any packets associated with VOIP to an outside line may be dropped.

The policy engine 204 may perform at least one of forward the set of network traffic to a destination based on the policy rule, send a packet to an application, and deny the set of network traffic. The policy rule may be a forwarding rule. For example, the forwarding rule may forward a set of network traffic to a destination when the requested behavior is in the set of permissible behaviors. Denial of a set of network traffic may result in forwarding the set of network traffic to an edge of the network, dropping the packets of the set of network traffic, or other action resulting in refusal of the set of network traffic. An example destination may be a client computer, a security engine, or other resource for the service request. The forwarding rule may forward a set of network traffic over a particular route over the network based on the context and the policy rule. For example, the forwarding rule may forward a set of network traffic through a route that includes a set of network devices authorized to provide the service. The security engine and traffic forwarding is discussed in more detail in the description associated with FIG. 4.

The policy rule may provide non-forwarding communication or activity. For example, the policy rule may determine to wait for further packets or send a packet to an application when the condition of the policy rule is met. Examples of packets that may be sent are ACKs, RSTs, or a packet understandable by the application, such as a packet to provide a message regarding the requested behavior.

The policy rule may also deny the set of network traffic based on the context. For example, the net of network traffic may be dropped or forwarded to a network edge (perimeter of the network) if the set of network traffic is associated with an impermissible behavior and identity combination.

The policy engine 204 may use context data associated with any appropriate layer of the program and/or communication. For example, the context may include the data from the application layer and/or the data form the transport layer. The policy engine 204 may map lower layer data to higher level data. For example, the policy engine 204 may compare a set of transport layer data with the context from the application to determine the policy rule.

The policy engine 204 may establish a network path. The policy engine 204 may rely on a SDN-enabled device or controller or other module to determine a network path. For example, the policy engine 204 may work in conjunction with a path engine, such as path engine 406 of FIG. 4, to determine a network path based on the context. The path engine is discussed in more detail in the description associated with FIG. 4.

The policy engine 204 may provide a policy rule to secure the network. For example, the network may have a default policy of network routing and routing may be modified based on the context. The network may allow minimal access by maintaining a default rule to deny network traffic and providing a dynamic policy rule to restrict the set of network traffic to the requested behavior when the requested behavior is included in a set of permissible behaviors. For example, the policy engine 204 may maintain a default rule to deny network traffic, maintain a set of permissible behaviors of a service to occur on the network based on the party and the service, provide a policy rule to a controller for a duration of a requested behavior when the party has been authorized to request the request behavior, and provide the default rule to the controller after the duration, such as completion of the requested behavior.

The policy engine 204 may be reactive to a change in context. For example, authorization of a party and/or a behavior may change as the application executes and the system operates. The policy engine 204 may maintain a policy rule associated with the party and the requested behavior based on an authentication of the party and update the policy based on a system event. For example, a party may no longer be authorized to perform a behavior after a violation occurs over the network and the policy rule may update to drop all current network traffic related to that party or combination of party and behavior. For another example, the application may be missing a software update to a fix bug or security threat, and the policy rule may determine to drop packets associated with a behavior affected by the bug or security threat.

The context engine 202 and the policy engine 204 may be integrated on a single device or distributed across multiple devices. For example, the context engine 202 and the policy engine 204 may be located on a compute device executing the application or an SDN controller distributed across network devices. A distributed context engine 202 and/or policy engine 204 may allow for any appropriate number of devices of the network to provide the policy rule and removes potential bottlenecks, such as always routing traffic through security appliances to inspect traffic before forwarding. For example, in a SDN environment where the SDN controller is distributed across devices, each SDN-compatible device may deploy the policy rule, allowing for the network and the security enforcement to scale at the same rate.

The data store 210 may store data used by or otherwise associated with the system 200. Specifically, the data store 210 may store data used by the context engine 202 and the policy engine 204. For example, the data store 210 may include data associated with the context of the service request, a policy rule, a list of identities, a set of permissible behaviors, a mapping between the context to a policy rule, etc.

FIG. 3 depicts that the example system 300 for providing a service may be implemented on a memory resource 320 operatively coupled to a processor resource 322. The processor resource 322 may be operatively coupled to a data store 310. The data store 310 may be similar to the data store 210 of FIG. 2.

Referring to FIG. 3, the memory resource 320 may contain a set of instructions that may be executable by the processor resource 322. The set of instructions may implement the system 300 when executed by the processor resource 322. The set of instructions stored on the memory resource 320 may be represented as a context module 302. The set of instructions stored on the memory resource 320 may be represented as multiple modules, such as a policy module 304 or other module discussed herein, such as the path module 406 or analysis module 408 of FIG. 4. The processor resource 322 may carry out the set of instructions to execute the context module 302, the policy module 304, and/or any appropriate operations between or associated with the modules of the system 300. For example, the processor resource 322 may carry out a set of instructions to identify a party requesting a service, identify a requested behavior of the service, and maintain a context to determine a policy rule to regulate a set of network traffic associated with the service based on the party and the requested behavior. The context module 302 and the policy module 304 represent program instructions that when executed function as the context engine 202 and the policy engine 204 of FIG. 2, respectively.

The processor resource 322 may be one or multiple CPUs capable of retrieving instructions from the memory resource 320 and executing those instructions. The processor resource 322 may process the instructions serially, concurrently, or in partial concurrence, unless described otherwise herein.

The memory resource 320 and the data store 310 represent a medium to store data utilized by the system 300. The medium is any non-transitory medium or combination of non-transitory mediums able to electronically store data and/or capable of storing the modules of the system 300 and/or data used by the system 300. A storage medium, such as memory resource 320, is distinct from a transmission medium, such as a signal. The medium may be machine-readable, such as computer-readable. The data of the data store 310 may include representations of data and/or information mentioned herein, such as identities, behaviors, policy rules, IP protocol information, and a state of the application or system.

In the discussion herein, engines 202 and 204 of FIG. 2 and the modules 302 and 304 of FIG. 3 have been described as a combination of circuitry and executable instructions. Such components may be implemented in a number of fashions. Looking at FIG. 3, the executable instructions may be processor executable instructions stored on the memory resource 320, which is a tangible, non-transitory computer readable storage medium, and the circuitry may be electronic circuitry, such as processor resource 322, for executing those instructions. The processor resource 322, for example, may include one or multiple processors. Such multiple processors may be integrated in a single device or distributed across devices. The memory resource 320 may be said to store program instructions that when executed by the processor resource 322 implements the system 300 in FIG. 3. The memory resource 320 may be integrated in the same device as the processor resource 322 or it may be separate but accessible to that device and the processor resource 322. The memory resource 320 may be distributed across devices, such as network devices 436 of FIG. 4. The memory resource 320 and the data store 310 may represent the same physical medium unless otherwise described herein.

In one example, the program instructions may be part of an installation package that when installed may be executed by processor resource 322 to implement the system 300. In that example, the memory resource 320 may be a portable medium such as a CD, a DVD, a flash drive, or memory maintained by a network device, such as network device 436 of FIG. 4, from which the installation package may be downloaded and installed. In another example, the program instructions may be part of an application or applications already installed. Here, the memory resource 320 may include integrated memory such as a hard drive, solid state drive, or the like.

Figure 4:
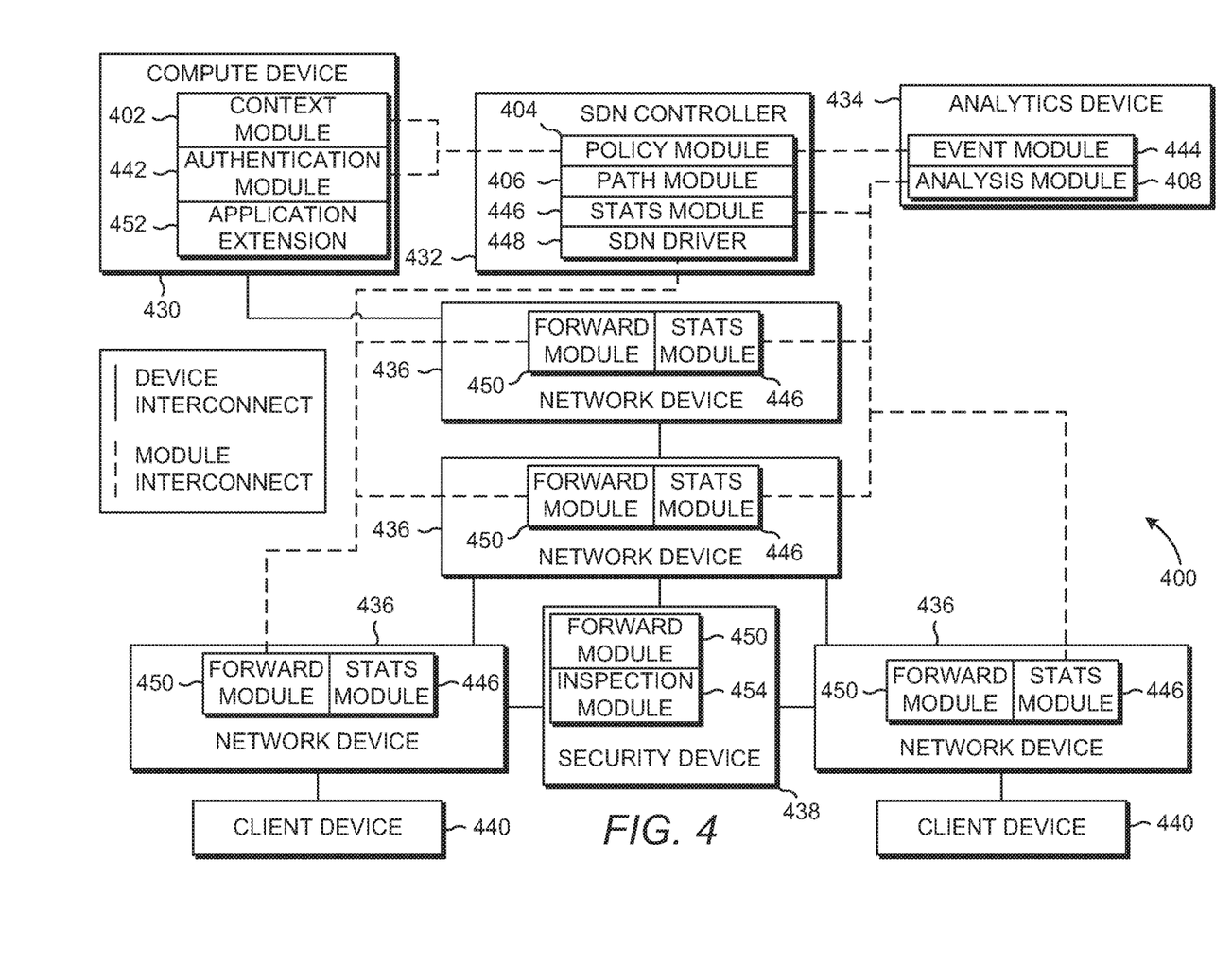
FIG. 4 depicts an example environment in which various examples for providing a service may be implemented.

FIG. 4 depicts an example environment in which various examples for providing a service may be implemented. The example environment 400 is shown to include an example system for providing a service. The system (described herein with respect to FIGS. 2 and 3) represents generally any combination of circuitry and executable instructions configured to provide a service. The environment 400 may include a compute device 430, an SDN controller 432, an analytics device 434, a network device 436, a security device 438, and a client device 440. The system may include a context module 402 and a policy module 404 that may be similar to the context module 302 and the policy module 304 of FIG. 3, respectively, and, for brevity, the associated descriptions are not repeated. The example system of FIG. 4 depicts the context module 402 and the policy module 404 on separate devices; however, other example systems may integrate the modules 402 and 404 on the same device or distribute the modules 402 and 404 in a different manner. For example, the context module 402 and the policy module 404 may be distributed across the compute device 430 and network devices 436. The system may also include a path module 406, an analysis module 408, an authentication module 442, an event module 444, a stats module 446, a SDN driver 448, a forward module 450, and an inspection module 454. Referring to the solid lines and dotted lines between blocks of FIG. 4, the blocks may be connected and/or communicate in the example arrangements depicted. The blocks of FIG. 4 may be connected and/or communicate in other arrangements.

The example environments may comprise a network that includes a compute device 430, a set of network devices 436, a security device 438, and a client device 440. The devices shown provide an example number of devices and redundant devices may exist in a network. For example, the example system of FIG. 4 shows multiple network devices 436; however, an example environment may include any number of network devices 436 and SDN controllers 432.

The compute device 430 may include a context module 402 and an authentication module 442. The compute device 430 may execute the application extension 452 having a context module 402 to maintain the context of the service request. The application extension 452 executed on the compute device 430 may use the authentication module 442 to authenticate the party identified in the context. Alternatively, the application extension 452 may receive the context and the authentication from an application executing on the compute device 430. The context and/or the authentication may be sent to the SDN controller 432.

The SDN controller 432 is a controller of the network that is SDN-compatible. The SDN controller 432 may be integrated in a single device or distributed across multiple devices, such as network devices 436. The SDN controller 432 may include a policy module 404, a path module 406, a stats module 446, and a SDN driver 448. The policy module 404 may receive the context and/or the authentication from the compute device 430. The policy module 404 may determine a policy rule based on the context and the authentication. The policy module 404 may forward the context to the event module 444 to determine if an analysis should be made on the set of network traffic.

The path module 406 represents program instructions that when executed by a processor resource function as a combination of circuitry and executable instructions configured to determine a network path of the network. For example, the path module 406 may determine a network path with a set of network devices that are authorized to provide a service. The policy rule may be used by the path module 406 to determine the network path. The path module 406 may also use information from the stats module 446 and/or analysis module 408 to determine the network path. The path module 406 may use SDN techniques in determining a network path. For example, if a network device is relatively latent, the path module 406 may determine a path through the network that avoids the latent network device.

The stats module 446 represents program instructions that when executed by a processor resource function as a combination of circuitry and executable instructions configured to maintain statistics regarding the network. For example, the stats module 446 may monitor a set of network traffic and the network path to determine if an alternative network path should be established. The stats module 446 may be distributed across devices or integrated in multiple devices and provide statistics to an analytics device 434 and/or an analysis module 408.

The analytics device 434 receives context, statistics, system events and other information associated with the set of network traffic to analyze the set of network traffic. The analytics device 434 may aggregate or other action to calculate an analysis of the set of network traffic and make network path determinations based on the analysis. For example, if the analysis module 408 receives information from the stats modules 446 that indicates the traffic is suspicious, the analytics device 434 may send a system event to update the policy rule and/or change the network path.

The analysis module 408 represents program instructions that when executed by a processor resource function as a combination of circuitry and executable instructions configured to analyze the set of network traffic. The analysis module 408 may be integrated into the same device as the SDN controller 432, integrated into a separate device, or distributed across devices. For example, the SDN controller may be logically connected to a network device having an analytics engine, such as analytics device 434. The analytics module 408 may analyze a set of network traffic of the network when the set of network traffic is forwarded by the SDN controller. For example, the analytics module 408 may determine a suspicion level of network traffic. The SDN controller 432 may make policy determination based on the analysis of the analysis module 408. For example, the SDN controller 432 may update the policy to route traffic associated with a particular party and behavior combination to a security device 438.

The security device 438 represents a security engine, which is a combination of circuitry and executable instructions configured to provide a security function to the network. For example, the security device 438 may contain a security module (program instructions that when executed by a processor resource function as a security engine), which may include an inspection module 454. For example, the security device 438 may include a combination of circuitry and executable instructions configured to inspect a set of network traffic. The security device 438 may configured to handle traffic of a suspicion level, such as a high suspicion level. For example, the security device 438 may include an inspection module 454 to inspect the set of network traffic, such as deep packet inspection, and make a determination of the security threat level of the set of network traffic. The analysis module 408 may determine a suspicion level of traffic and notify the SDN controller of the analysis. The path engine 406 may identify a security device, such as security device 438, having the security engine based on the suspicion level of traffic, maintain the network path to include the security engine based on an analysis of the set of network traffic, and provide the policy rule to the set of network devices of the network path based on a system event, such as a network traffic analysis event. The network may contain multiple security devices 438 and the policy engine 404 may determine a forwarding rule to forward the set of network traffic to a number of the security devices 438. The SDN controller 432 and/or the analytics device 434 may receive a set of data from the security device 438 and the policy rule may be updated based on the set of data received from the security device 438. For example, the policy rule may update to forward traffic associated with a particular party and behavior combination to a particular security device 438 or update the policy rule to forward the network traffic around the security device 438 because the network traffic was determined to be safe.

The SDN driver 448 may manage the network traffic and pass along the policy rule to the network devices 436. For example, the network path determined by the path engine 406 may be sent to the forward module 450 on each network device 436. Each network device 436 may forward the set of network traffic based on the forwarding rule received from the SDN controller 432. For example, the policy rule may determine the set of network traffic is not a security threat and the set of network traffic may be routed to the client device 440 to transact the requested behavior. The policy rule may be forwarded to implement security at each of the ports of a set of network devices of the network path, such as the network edge ports. Once the requested behavior is complete, the policy rule and the forward modules 450 may then be updated to a default forwarding rule, such as forwarding the set of network traffic to the edge of the network.

The modules 402, 404, 406, and 408 of the example system of FIG. 4 may be integrated into an electronic device, such as compute device 430, SDN-enabled switch 432, analytics device 434, network device 436, security device 438, or client device 440. The example system may be distributed across a combination of devices 430, 432, 434, 436, 438, and 440. The environment may include a traditional client-server environment and/or a cloud computing environment. For example, any appropriate combination of the example system of FIG. 4 4 and devices 430, 432, 434, 436, 438, and 440 may be a virtual instance and/or may reside and/or execute on a virtual shared pool of resources described as a "cloud."

In the example of FIG. 4, a compute device 430 may request to communicate with a client device 440. The compute device 430 represents generally any computing devices configured to respond to a network request received from another device such as client device 440. For example, a compute device 430 may provide the service and the client device 440 may be a computing device configured to receive and/or communicate with the service. A compute device 430 may include a web server, an application server, or a data server, for example. The client devices 440 represents generally any computing devices configured with a browser or other application to communicate such requests and receive and/or process the corresponding responses.

Referring to FIG. 4, the lines between blocks depict example interconnections. For example, the compute device 430 may be in communication with the SDN controller 432. FIG. 4 provides example interconnections among devices and example interconnections among modules. The interconnections may be physical and/or logical. A physical interconnect is generally one or any combination of a cable, wireless, fiber optic, or remote connections via a telecommunications link, an infrared link, a radio frequency link, or any other connectors of systems that provide electronic communication. A physical interconnect may include, at least in part, intranet, the Internet, or a combination of both. A physical interconnect may also include intermediate proxies, routers, switches, load balancers, and the like. A logical interconnect is generally a transmission method that may provide communication among blocks. For example, the SDN driver 448 may be communicate with the forward module 450 of the network device 436 in a SDN environment where the control plane is separated from the transport layer of the network. In that example, the forward modules 450 may not be physically connected, but may be able to communicate with each other.

Referring to FIGS. 2-4, the engines 202 and 204 and/or the modules 302, 304, 402, 404, 406, 408, 442, 444, 446, 448, 450, and 454 may be distributed across devices 430, 432, 434, 436, 438, and 440, storage mediums, or a combination thereof. The engines and/or modules may complete or assist completion of operations performed in describing another engine and/or module. For example, the policy module 404 may request and/or complete the operations and/or perform the methods of the path module 406. The engines and/or modules may perform the example methods described in connection with FIGS. 5-7.

Figure 5:
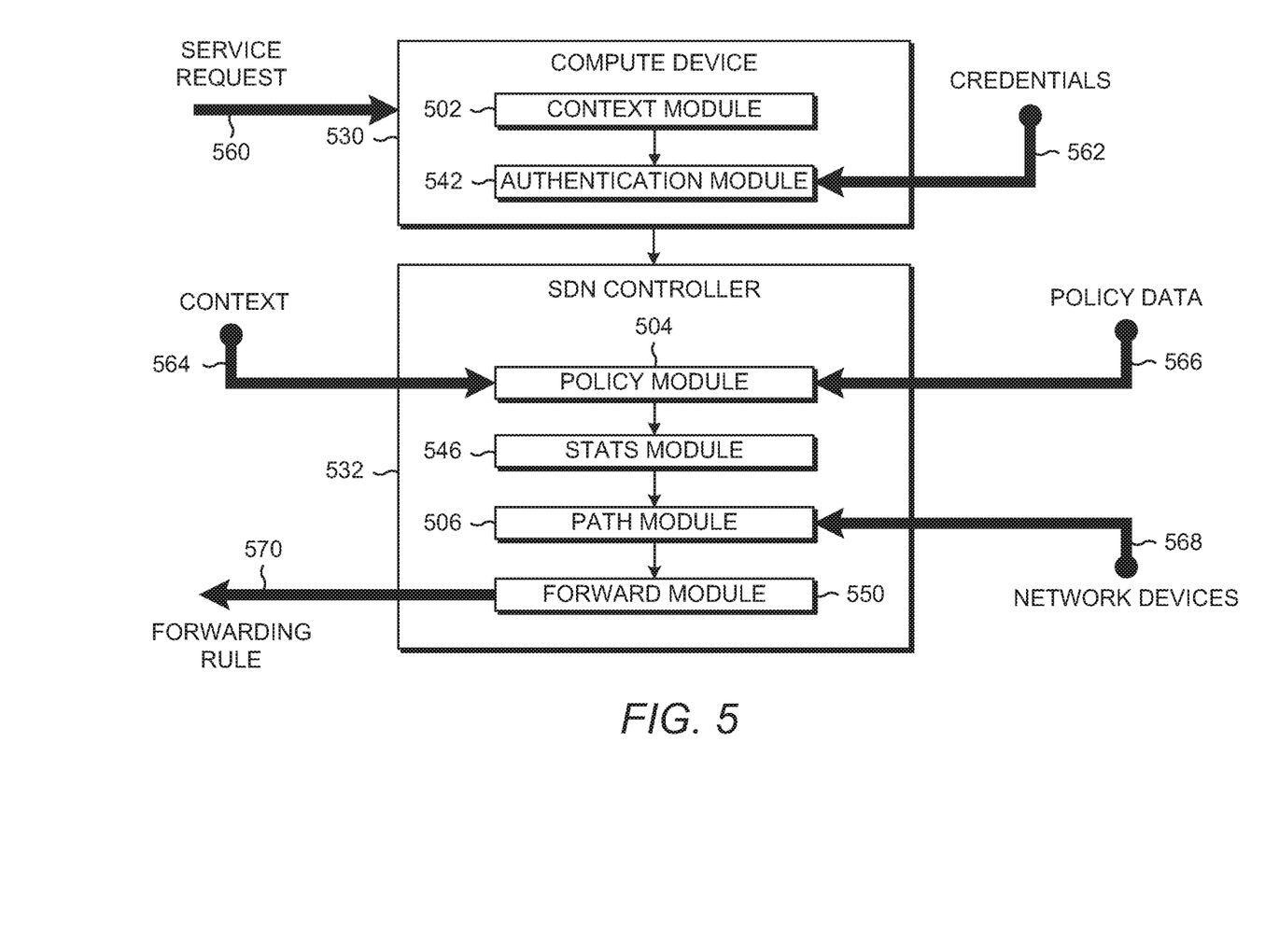
FIG. 5 depicts example modules used to implement example systems for providing a service.

FIG. 5 depicts example modules used to implement example systems for providing a service. The compute device 530 and the SDN network device 532 may represent the same as the compute device 430 and the SDN controller 432 of FIG. 4, and, for brevity, the descriptions are not repeated.

The compute device 530 may execute the application extension which may receive a service request 560. The compute device 530 may determine and/or receive the context 564 of the service request 560. For example, the context module 502 may determine the party making the request and the requested behavior of the service based on the service request 560. The party may be identified and authenticated by the authentication module 542. For example, the application extension may request and/or receive a set of credentials 562 from the party making the request to determine the identity of the party is authentic.

The SDN network device 532 may receive a context 564 and a set of policy data 566. The policy module 504 may make a policy rule determination based on the context 564 and the policy data 566. For example, the policy data 566 may be a set of policy rules having a set of conditions and the context 564 may determine which set of conditions are satisfied, and thereby, which policy rule(s) may be implemented and/or provided by the SDN network device 532. The stat module 546 may be used by the SDN network device 532 to update the policy rule based on statistics related to the network. For example, the SDN network device 532 may utilize health statistics of the set of network devices of the network, such as the network devices 436 of FIG. 4, to determine a policy rule and/or a network path. The path module 506 may receive a set of network devices 568 of the network and determine a network path. For example, the path module 506 may receive a dynamic set of network devices 568 based on health monitoring and authorization of the devices to provide the service. The forward module 550 may translate the selected network path into a forwarding rule 570. The forwarding rule 570 may be forwarded to the set of network devices of the network path. The forwarding rule 570 may include a time duration, such as a maximum time for completion of the requested behavior. For example, the policy rule may update the forwarding rule 570 to a default rule once the time duration is achieved.

Figure 6:
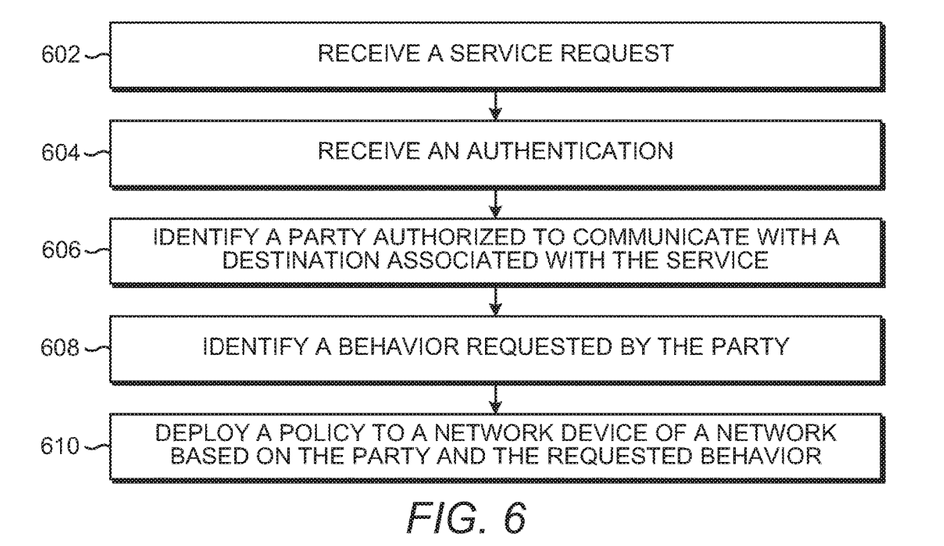
FIGS. 6 and 7 are flow diagram depicting example methods for providing a service.
Figure 7:
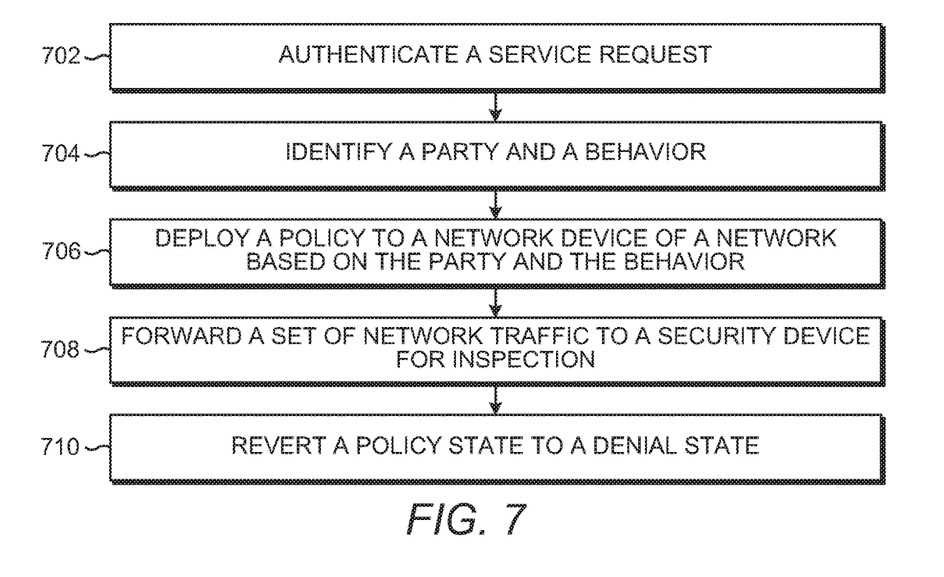

FIGS. 6 and 7 are flow diagram depicting example methods for providing a service. Referring to FIG. 6, example methods for providing a service may generally comprise receiving a service request, identifying a party, identifying a behavior requested by the party, and deploying a policy to a network device of a network based on the party and the behavior.

At block 602, a service request may be received. The service request may be provided from the application executing on a device of the network. The service request may include a set of data related to a context of the service request. For example, the service request may include a destination for the request in the form of an IP address. The set of data may be gathered by the context module 502 of FIG. 5, for example.

At block 604, an authentication may be received. The authentication may be performed by an application extension executing on a compute device, such as compute device 530 of FIG. 5. By including an authentication as part of the context to be received by the policy engine, the SDN controller may route the set of network traffic knowing the source of the request for network traffic is authentic, rather than guessing the set of network traffic originates form the authentic source, such as by pattern matching or analysis of the network packets.

At block 606, a party may be identified. The party may be identified as authorized to communicate with a destination associated with the service. For example, the destination may be a client device, such as client device 340 of FIG. 3, and the party may be authorized if the destination is expecting a communication from the party. The destination may be a client device, a server device, or a network device that may contain a resource to be used by the application or otherwise be desirable to communicate with to perform the behavior of the service.

At block 608, a behavior requested by the party may be identified. The behavior may be provided as a list of possible behaviors associated with a service. The behavior may be identified based on the context. For example, the behavior may be included in the service request and the context module, such as context module 502 of FIG. 5, may parse the behavior from the parameters received with the service request.

At block 610, a policy may be deployed to a network device of a network based on the party and the behavior. For example, the policy engine, such as policy engine 504 of FIG. 5, may determine a set of network devices, such as network devices 436 of FIG. 4, and may deploy the policy by sending the policy rule to each of the set of network devices. The policy may be a forwarding policy or other action taken in response to the set of network traffic associated with the combination of party and behavior. The policy may be deployed to all or a subset of the network devices of the network. For example, if the policy is to route the set of network traffic through a particular set of network devices authorized to provide the service, than the policy may be deployed on each of the set of network devices. The set of network devices may receive a forwarding rule or otherwise forward the set of network traffic based on the policy rule. For example, the set of network traffic may be permissible the policy rule may configure the net of network devices to forward the set of network traffic to the destination or the set of network traffic may be impermissible and the policy rule may configure the set of network devices to forward the set of network traffic to an edge of the network.

FIG. 7 includes similar blocks as FIG. 6 and provides additional blocks and additional details. In particular, FIG. 7 depicts additional blocks and details generally regarding forwarding a set of network traffic to a security device and reverting a policy state to a denial state. The blocks 702, 704, and 706 are similar to blocks 602, 604, 606, 608, and 610 of FIG. 6, and for brevity, the associated descriptions are not repeated.

At block 708, a set of network traffic may be forwarded to a security device for inspection. For example, an analysis module, such as analysis module 308 of FIG. 3, may analyze a set of network traffic and determine the network traffic achieves a threat threshold and should be further inspected. The threat threshold may be a degree of suspicion that the traffic may offer a threat to the network. The controller, such as SDN controller 432 of FIG. 4, may deploy a policy rule to route the traffic to a security device, such as security device 438 of FIG. 4, based on the analysis by the analysis module. Once received by the security device, an inspection module, such as inspection module 454 of FIG. 4, may perform an inspection of the set of network traffic based on a security protocol. For example, the security protocol may execute deep packet inspection to determine if the set of network traffic contains a security threat. The security protocol may be a procedure based on the level of suspicion.

At least one of the policy and the network path may be updated based on the inspection of the set of network traffic. For example, the results of the inspection may determine that the policy is to be updated to forward the traffic associated with the behavior to a particular network device, such as a honey-pot, or to the edge of the network.

At block 710, a current policy state may be reverted to a previous policy state after a communication regarding the behavior terminates. For example, the network's policy state may be a default policy to send network traffic to a security device at the time of initiating the set of network traffic, the policy may be updated to allow network traffic related to the service request during the transmission of the net of network traffic (e.g. once the traffic has been inspected by the security engine, such as security device 438 of FIG. 4), and may revert to the previous policy once the behavior completes execution (e.g. send traffic to the security device again). The previous policy state may be a state of denial of network traffic. For example, the default policy may be to restrict a set of network traffic to an edge of the network. Restricting communications of a network until a set of network traffic has been authorized by an application extension based on the context of the service request may allow for the minimal amount of access to the network at any given time. Thereby, the network may maximize security by allowing network traffic based on context, such as a requested behavior, rather than on identity or transport layer data alone.

Although the flow diagrams of FIGS. 5-7 illustrate specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present invention.

The present description has been shown and described with reference to the foregoing examples. It is understood, however, that other forms, details, and examples may be made without departing from the spirit and scope of the invention that is defined in the following claims.

What is claimed is:

1. A method for providing a service, comprising:
performing, by a controller:
receiving a service request and an authentication from an application;
identifying a party authorized to communicate with a destination associated with the service;
determining a context that includes an identity of the party and information regarding a behavior requested by the party;
identifying a policy based on the context;
identifying the behavior requested by the party;
deploying the policy to a network device of a network based on the party and the behavior to restrict a set of network traffic of the service to the behavior, the policy deployed to the network device to cause the network device to route the set of network traffic based on applying the policy, the routing comprising forwarding the set of network traffic to the destination or denying transmission of the set of network traffic to the destination; and
reverting a current policy state to a previous policy state after a communication regarding the behavior terminates, wherein the previous policy state is a denial state to restrict the set of network traffic to an edge of the network.

2. The method of claim 1, comprising:
analyzing the set of network traffic; and
forwarding the set of network traffic to a security device based on the analyzing; and
performing an inspection of the set of network traffic based on a security protocol.

3. The method of claim 2, comprising:
updating at least one of the policy and a network path based on the inspection of the set of network traffic.

4. The method of claim 1, further comprising:
routing, by the network device, the set of network traffic based on applying the policy, by forwarding the set of network traffic to the destination or denying transmission of the set of network traffic to the destination.

5. The method of claim 1, wherein the authentication is requested by the party.

6. The method of claim 1, wherein the controller comprises a software-defined networking (SDN) controller, and the network device is an SDN-enabled network device.

7. The method of claim 1, wherein the destination is identified by a network address in the service request.

8. The method of claim 1, wherein the party is a source of the set of network traffic.

9. The method of claim 1, wherein the behavior is identified by the service request.

10. The method of claim 1, wherein identifying the behavior comprises identifying the behavior from a list of behaviors associated with the service.

11. A non-transitory computer-readable storage medium storing instructions that upon execution cause a controller to:
receive a service request and an authentication from an application;
identify a party authorized to communicate with a destination associated with the service;
determine a context that includes an identity of the party and information regarding a behavior requested by the party;
identify a policy based on the context;
identify the behavior requested by the party;
deploy the policy to a network device of a network based on the party and the behavior to restrict communication of a set of network traffic of the service, the policy deployed to the network device to cause the network device to route the set of network traffic based on applying the policy, the routing comprising forwarding the set of network traffic to the destination or denying transmission of the set of network traffic to the destination;
analyze the set of network traffic;
forward the set of network traffic to a security device based on the analyzing;
perform an inspection of the set of network traffic based on a security protocol; and
update at least one of the policy and a network path based on the inspection of the set of network traffic.

12. The non-transitory computer-readable storage medium of claim 11, storing further instructions that upon execution cause the network device to:
route the set of network traffic based on applying the policy, by forwarding the set of network traffic to the destination or denying transmission of the set of network traffic to the destination.

13. The non-transitory computer-readable storage medium of claim 11, wherein the authentication is requested by the party, and the party is a source of the set of network traffic.

14. The non-transitory computer-readable storage medium of claim 11, wherein the destination is identified by a network address in the service request.

15. The non-transitory computer-readable storage medium of claim 11, wherein the controller comprises a software-defined networking (SDN) controller, and the network device is an SDN-enabled network device.

16. A controller comprising:
a computer processor; and
a non-transitory storage medium storing instructions executable on the computer processor to:
receive a service request and an authentication from an application;
identify a party authorized to communicate with a destination associated with the service;
determine a context that includes an identity of the party and information regarding a behavior requested by the party;
identify a policy based on the context;
identify the behavior requested by the party; and
deploy the policy to a network device of a network based on the party and the behavior to restrict communication of a set of network traffic of the service, the policy deployed to the network device to cause the network device to route the set of network traffic based on applying the policy, the routing comprising forwarding the set of network traffic to the destination or denying transmission of the set of network traffic to the destination; and
revert a current policy state to a previous policy state after a communication regarding the behavior terminates, wherein the previous policy state is a denial state to restrict the set of network traffic to an edge of the network.

17. The controller of claim 16, wherein the party is a source of the set of network traffic.

* * * * *